US012011003B2

(12) United States Patent
Van Blokland

(10) Patent No.: US 12,011,003 B2
(45) Date of Patent: Jun. 18, 2024

(54) FUNNEL, LINING FOR A FUNNEL, DOUGH LINE AND METHOD FOR CLEANING A FUNNEL

(71) Applicant: Radie B.V., Culemborg (NL)

(72) Inventor: Johannes Josephus Antonius Van Blokland, Culemborg (NL)

(73) Assignee: RADIE B.V., Culemborg (NL)

( * ) Notice: Subject to any disclaimer, the term of this patent is extended or adjusted under 35 U.S.C. 154(b) by 0 days.

(21) Appl. No.: 17/571,582

(22) Filed: Jan. 10, 2022

(65) Prior Publication Data
US 2022/0217982 A1 Jul. 14, 2022

(30) Foreign Application Priority Data
Jan. 12, 2021 (EP) .................................... 21151211

(51) Int. Cl.
*B67C 11/00* (2006.01)
*A21C 9/08* (2006.01)

(52) U.S. Cl.
CPC ................ *A21C 9/08* (2013.01); *B67C 11/00* (2013.01)

(58) Field of Classification Search
CPC .... B65D 90/046; B65D 88/26; B65D 90/041; B65D 90/04; B65B 39/00; B67C 11/02; B67C 11/00; B67C 2011/022; B67C 2011/027; B67C 11/04; B67C 11/06; B67C 11/063; B67C 11/066; B67C 2011/20; B67C 2011/30; B67C 2011/40; B65G 11/16; B65G 11/163; B65G 11/166; A21C 9/08; A21C 3/04
USPC ......................................... 141/331–345, 390
See application file for complete search history.

(56) References Cited

U.S. PATENT DOCUMENTS

| 2,905,110 | A | * | 9/1959 | Bundschuh | .......... A21C 11/163 425/288 |
| 4,925,880 | A | * | 5/1990 | Stein | ....................... C08L 23/06 521/143 |
| 5,244,069 | A | * | 9/1993 | Cosgrove | ................. E04G 21/04 193/5 |
| 5,323,819 | A | * | 6/1994 | Shade | ................... B65B 39/001 141/93 |
| 5,480,018 | A | * | 1/1996 | Sasaki | ..................... B29C 37/00 193/2 R |

(Continued)

FOREIGN PATENT DOCUMENTS

NL 1010037 C1 3/2000

OTHER PUBLICATIONS

CN-201227843-Y with translation, Apr. 2009, Yang H, translation retireved: Apr. 28, 2023.*

*Primary Examiner* — Timothy P. Kelly
(74) *Attorney, Agent, or Firm* — The Dobrusin Law Firm, P.C.

(57) ABSTRACT

The present invention relates to a funnel for dough or dough ingredients, comprising at least one funnel wall, extending from a receiving opening to a dispensing opening and comprising containing means for a removable lining, at least one removable lining, corresponding with the shape and area of said funnel wall and comprising positioning means for positioning the lining with respect to the funnel wall, wherein the positioning means are adapted for at least limiting a movement of the lining with respect to the funnel in a direction from the receiving opening toward the dispensing opening in at least one respective mutual orientation of the funnel wall and the lining.

18 Claims, 2 Drawing Sheets

(56) References Cited

U.S. PATENT DOCUMENTS

Figure 1:
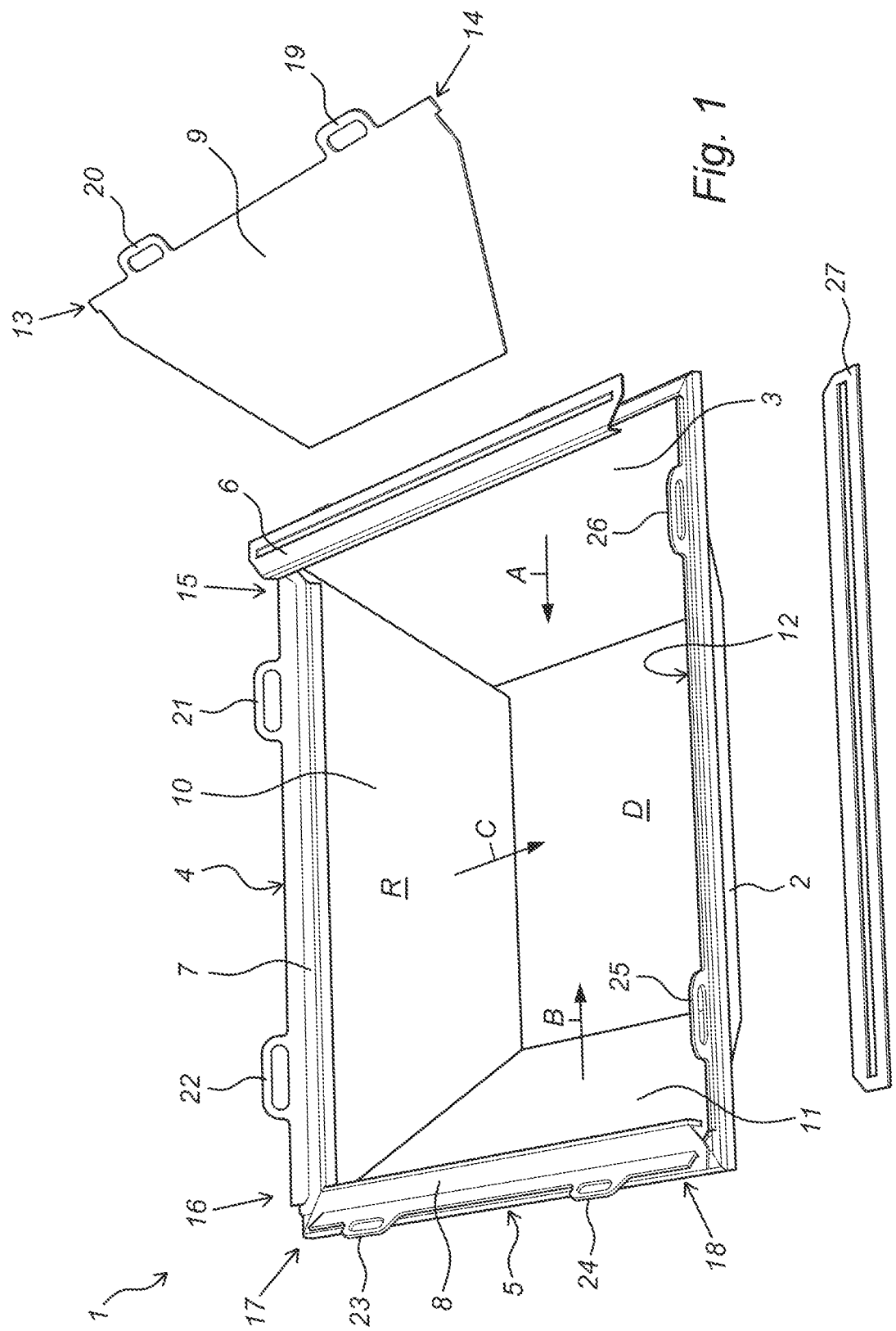

| | | | | |
|---|---|---|---|---|
| 5,840,345 A * | 11/1998 | Ayash | ................ | A21C 3/10 |
| | | | | 426/503 |
| 8,567,456 B1 * | 10/2013 | Francis | ................ | B67C 11/02 |
| | | | | 141/340 |
| 2004/0031793 A1 * | 2/2004 | Garcia | ................ | B65D 90/022 |
| | | | | 220/1.5 |
| 2010/0243656 A1 * | 9/2010 | Nazarian | ................ | B67D 7/02 |
| | | | | 29/428 |
| 2017/0320668 A1 * | 11/2017 | Gill | ................ | B65G 11/206 |
| 2020/0247614 A1 * | 8/2020 | Lipford | ................ | B28C 5/0806 |

\* cited by examiner

FUNNEL, LINING FOR A FUNNEL, DOUGH LINE AND METHOD FOR CLEANING A FUNNEL

The present invention relates to a funnel, a lining for a funnel, a dough line comprising such funnel and a method for cleaning a funnel. Funnels may be referred to in the art as hoppers as well, and in case they are provided with cutting or portioning means also as chunkers.

Funnels are used to receive and send ingredients for a baking process, often this may be dough, or ingredients thereof. They may be input from the funnel to one or more machines in a dough line, or to a buffer vessel. As it goes for all food processing apparatus that are applied on an industrial scale, there are strict regulations regarding food safety and hygiene.

One possible risk that occurs when sticky products such as dough or ingredients thereof are handled, is that of pollution, in particular a risk of caking of the ingredients. This is undesirable from a hygiene point of view and results in the requirement that the funnel should be cleaned regularly. However, cleaning cannot always be carried out on site using cleaning agents or (hot) water and is therefore a labor-intensive process which often also damages the funnel.

Additionally, such (either on or off-site) cleaning operation implies a down time of the funnel and possibly the dough line that follows, which is considered as a disadvantage.

Often the choice is made to coat a (stainless steel) funnel with PTFE (Teflon) to prevent caking and facilitate cleaning, but there is an increasing desire to refrain from the use of this material in connection with food safety. The coating can come loose and get into the food which is evidently undesired.

It is a goal of the present invention to propose a solution that takes away at least part of the disadvantages of the prior art, or to provide a useful alternative to the state of the art.

The invention thereto proposes a funnel for dough or dough ingredients, comprising at least one funnel wall, extending from a receiving opening to a dispensing opening and comprising containing means for a removable lining, further comprising at least one removable lining, corresponding with the shape and area of said funnel wall; and comprising positioning means for positioning the lining with respect to the funnel wall, wherein the positioning means are adapted for at least limiting a movement of the lining with respect to the funnel in a direction from the receiving opening toward the dispensing opening in at least one respective mutual orientation of the funnel wall and the lining.

The removable lining prevents the pollution of the funnel wall itself by sticky dough or dough ingredients. Cleaning of the funnel can be done off-site by removing the lining and cleaning it at an appropriate location which may be remote from the funnel wall or the rest of the dough line. The lining may also be swapped by a similar one, in which case the funnel and a possible dough line in which it is incorporated can be operated uninterruptedly.

In general, the dispensing opening of a funnel may be smaller than the receiving opening. The funnel may comprise a single wall, for instance a cone shaped wall, or be composed of multiple walls or wall parts, and comprise a polygonal or even rectangular cross section, in particular in a horizontal plane. The at least one lining may correspond with the at least one wall in shape and size, but it is also possible that multiple linings cover one wall, or that one lining covers multiple walls.

A lining in the sense of the present invention is to be seen as a physical object, and removable to be interpreted as removable without damaging or changing it as a whole, or changing its consistency. In particular it is to be seen as a rigid or flexible object, more in particular with an essentially planar shape. A paint, lubricant, water or PTFE coating as such form no lining according to the invention, however they may form part of it. The lining may extend beyond the physical limitations of the funnel wall.

In a preferred embodiment, the at least one lining forms a closed surface, extending from a receiving opening to a dispensing opening. More in particular, an assembly of linings according to the present invention forms a closed surface. A closed surface in this sense is a surface that comprises no other through-holes, slots or other passthroughs than the receiving and dispensing opening.

In a further embodiment, the at least one lining is form-fitting with the at least one funnel wall. That means that the lining is in contact with the funnel surface over an essential part of its surface area, or contact points, surfaces or area's are distributed over an essential part of the lining.

An essential part is to be interpreted as more than 50%, and preferably more than 80%, 90% or even 95%. A form-fitting contact leads to more robustness, and assures that there are no locations in between the lining and the funnel where pollution can take place.

It may be desired that there is always a small distance between the funnel wall and the lining, to avoid moist or condensed water to stick there. For that purpose, the side of the lining intended for facing the funnel and/or the funnel wall to be covered by the lining may comprise means for keeping such small distance. These means may for instance be formed by small protrusions, dots, ridges or another suitable relief or profile or texture.

In yet a further embodiment, the funnel according to the invention comprises multiple mutually connected funnel walls, and multiple removable linings, wherein each of the linings corresponds with the shape and area of at least one funnel wall and the multiple removable linings together correspond with the shape and area of the multiple mutually connected funnel walls.

In an embodiment, the at least one removable lining comprises an essentially tapered shape. Such shape results from the general shape of a funnel and may be a more or less implicit feature of a funnel. The shape makes that at least in a direction from the from the receiving opening toward the dispensing opening the at least one removable lining is self-locking in at least the direction against the direction from the receiving opening toward the dispensing opening, in those cases where the receiving opening has a larger cross section than the dispensing opening. The lining locks itself by abutment against adjacent funnel walls and/or linings. However, other forms and shapes of the lining than tapered ones may be used to obtain self-locking properties too, and embodiments are also thinkable wherein the cross section of the funnel widens in at least a part of the trajectory from receiving to dispensing opening. In those cases, the lining may be mounted in an opposite direction.

In a further embodiment, wherein the funnel comprises multiple linings, at least one first lining locks at least one second lining in a direction different from the direction from the receiving opening toward the dispensing opening. This means that the first lining locks the second lining. Preferably, a combination of all linings lock one another in all directions except for the direction against that from the receiving opening toward the dispensing opening. In this case, the lining can be lifted out of the funnel wall as a whole or in parts, but it cannot move otherwise. These self-locking properties contribute to the simplicity of the funnel, and make the use of additional parts and tooling obsolete.

The positioning means may comprise at least one broadening, such as a notch, in the shape of the lining, wherein the broadening is configured for abutment with the funnel. However, in some embodiments, the above described tapered shape may act as positioning means. The edges of the lining may comprise a faceted cut, so they lock one another, or they may have straight edges. In the latter case an upper laying lining locks the one it partially covers.

The containing means of the funnel wall may for instance comprise a slot, a guide or a notch.

The removable lining may comprise a plastics material, such as HMPE. Preferably it consists of HMPE, but HPME on a carrier of another material is also thinkable.

The funnel may normally be made of stainless steel or the like. The lining may be selfsupporting. It may be flexible but preferably be rigid. It may comprise handling points, in particular formed by handles. Those handles may be suitable for manual placement of the lining or for handling by a machine such as a robot or hoist.

The funnel as described above may be used in a dough line, and its use may comprise the step of removing the at least one lining from a funnel, cleaning it outside or remote from the funnel and positioning it back in the funnel after cleaning, when cleaning is required. Optionally, a spare lining or multiple spare sets of linings may be present, so that another lining can be positioned in place during cleaning of the at least one lining.

The invention will now be elucidated into more detail with reference to the following FIGURE.

Figure 2:
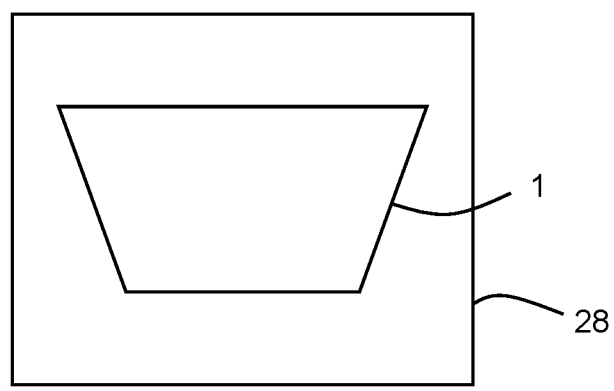

FIG. 1 shows a funnel 1 for dough or dough ingredients according to the present invention and FIG. 2 shows the funnel 1 with a dough line 28. The funnel 1 comprises four funnel walls 2-5, each extending from a receiving opening R to a dispensing opening ID, and comprising containing means 6-8, 27 for a removable lining, four removable linings 9-12, each corresponding with the shape and area of a corresponding funnel wall 2-5; and comprising positioning means formed by their shapes and additionally by notches 13-18 for positioning the lining with respect to the funnel wall, wherein the positioning means are adapted for at least limiting a movement of the lining with respect to the funnel in a direction from the receiving opening toward the dispensing opening in at least one respective mutual orientation of the funnel wall and the respective lining. In the case shown, the notches cooperate with the containing means, formed by slots 6-8. The notches exceed the width of the slots and the lining is suspended by the notches (and in the case shown as well by the shape of each lining that is form-fitting with the shape of the funnel wall it covers).

The linings form a closed surface, that is: once they are in place, extending from a receiving opening to a dispensing opening. In FIG. 1, lining 9 is taken out of its position. When positioned, lining 10 locks linings 9 and 11 directions A and B, which are different from the direction C from the receiving opening R toward the dispensing opening D. The removable lining comprises handling points 19-26, formed by handles.

The invention claimed is:

1. A funnel for dough or dough ingredients, comprising:
   at least two funnel walls:
      extending from a receiving opening to a dispensing opening; and
      each comprising a slot for a removable lining;
   at least two removable linings, each of the at least two removable linings being separate one another and:
      fabricated from a food grade material;
      respectively corresponding with a shape and area of said at least two funnel walls to be form-fitting thereto and assuring that there are no locations in between the at least two removable linings and the at least two funnel walls where pollution from the dough or dough ingredients can take place; and
      each comprising at least one broadening in the shape of the at least one removable lining for positioning the at least one removable lining with respect to the funnel wall, wherein the at least one broadening is adapted for at least limiting a movement of the at least one removable lining with respect to the funnel in a direction from the receiving opening toward the dispensing opening in at least one respective mutual orientation of the funnel wall and the at least one removable lining.

2. The funnel according to claim 1, wherein the at least two removable linings forms a closed surface, extending from the receiving opening to the dispensing opening.

3. The funnel according to claim 1, wherein the at least two funnel walls are mutually connected, and wherein the at least two removable linings together correspond with the shape and area of the at least two funnel walls that are mutually connected.

4. The funnel according to claim 1, wherein the at least two removable linings comprises an essentially tapered shape.

5. The funnel according to claim 1, wherein the at least two removable linings are self-locking in at least the direction from the receiving opening toward the dispensing opening.

6. The funnel according to claim 1, wherein the at least two removable linings includes at least one first lining and at least one second lining; wherein the at least one first lining locks the at least one second lining in a direction different from the direction from the receiving opening toward the dispensing opening.

7. The funnel according to claim 1, wherein the at least one broadening abuts the funnel; and wherein the at least one broadening includes a notch.

8. The funnel according to claim 1, wherein the food grade material includes HMPE.

9. The funnel according to claim 1, wherein the at least two removable linings comprises handles.

10. A dough line comprising the funnel according to claim 1.

11. A method for operating the dough line according to claim 10, comprising removing the at least two removable linings from the funnel, cleaning the at least two removable linings outside or remote from the funnel and positioning the at least two removable linings back in the funnel after cleaning.

12. The method according to claim 11, comprising positioning another lining in place during cleaning of the at least two removable linings.

13. The funnel according to claim 7, wherein the notch is coplanar with each of the at least two removable linings.

14. The funnel according to claim 13, wherein the notch extends from a first edge of the at least two removable linings.

15. The funnel according to claim 14, wherein the notch extends beyond a dimension of the slot.

16. The funnel according to claim 15, wherein each of the at least two removable linings include an additional notch extending from a second edge of the at least two removable linings, the second edge opposing the first edge.

17. The funnel according to claim 16, wherein the slot is contained on a member that is structurally discrete from and locatable onto an edge of the at least two funnel walls.

18. The funnel according to claim 1, wherein the at least two removable linings are locatable relative to the at least two funnel walls by axially translating the at least two removable linings respectively through each of the slots of the at least two funnel walls; and wherein said axial translation is in the direction from the receiving opening toward the dispensing opening.

\* \* \* \* \*

UNITED STATES PATENT AND TRADEMARK OFFICE
CERTIFICATE OF CORRECTION

PATENT NO. : 12,011,003 B2
APPLICATION NO. : 17/571582
DATED : June 18, 2024
INVENTOR(S) : Johannes Josephus Antonius Van Blokland It is certified that error appears in the above-identified patent and that said Letters Patent is hereby corrected as shown below:

In the Claims

Column 4, Line 28, delete "forms a closed" and insert --form a closed--

Signed and Sealed this
Thirteenth Day of August, 2024

Katherine Kelly Vidal
*Director of the United States Patent and Trademark Office*